United States Patent [19]

Adamson

[11] Patent Number: 4,567,819

[45] Date of Patent: Feb. 4, 1986

[54] APPARATUS FOR TWO-SIDED GRILLING OF HAMBURGER PATTIES

[75] Inventor: Lee E. Adamson, Roscoe, Ill.

[73] Assignee: Taylor Freezer Company, Rockton, Ill.

[21] Appl. No.: 695,662

[22] Filed: Jan. 28, 1985

[51] Int. Cl.[4] ............................................. A47J 37/04
[52] U.S. Cl. ........................................ 99/349; 99/331; 99/337; 99/342; 99/355; 99/373; 99/387; 99/390; 99/391; 99/400; 99/423; 99/425; 99/443 C; 99/446
[58] Field of Search ................. 99/349, 331, 337, 342, 99/355, 386, 387, 372, 373, 377, 390, 391, 400, 423, 425, 443 C, 446; 426/523

[56] References Cited

U.S. PATENT DOCUMENTS

| | | | |
|---|---|---|---|
| 1,678,337 | 7/1928 | Halifax | 99/387 |
| 2,014,595 | 9/1935 | Simmons | 99/387 X |
| 3,693,452 | 9/1972 | McGinley | 99/349 X |
| 3,739,712 | 6/1973 | Duning | 99/390 X |
| 3,965,807 | 6/1976 | Baker | 99/446 X |
| 3,987,718 | 10/1976 | Lang-Ree et al. | 99/386 |
| 4,254,697 | 3/1981 | Lang-Ree | 99/443 C X |
| 4,444,094 | 4/1984 | Baker et al. | 99/386 X |

Primary Examiner—Billy J. Wilhite
Attorney, Agent, or Firm—Vernon J. Pillote

[57] ABSTRACT

A front loading and unloading grill apparatus for two-sided grilling of hamburger patties. The grill apparatus includes upper and lower cooking platens, a patty support panel at the front of the lower cooking platen and an endless conveyor for advancing uncooked patties from the patty support panel onto the lower cooking platen. The patty support panel is retracted away from the front of the lower cooking platen and, when the patties are cooked, the conveyor is operated in the reverse direction to move the cooked patties off the front lower cooking platen and discharge the same to a cooked patty receiver at the front side of the grill apparatus.

17 Claims, 8 Drawing Figures

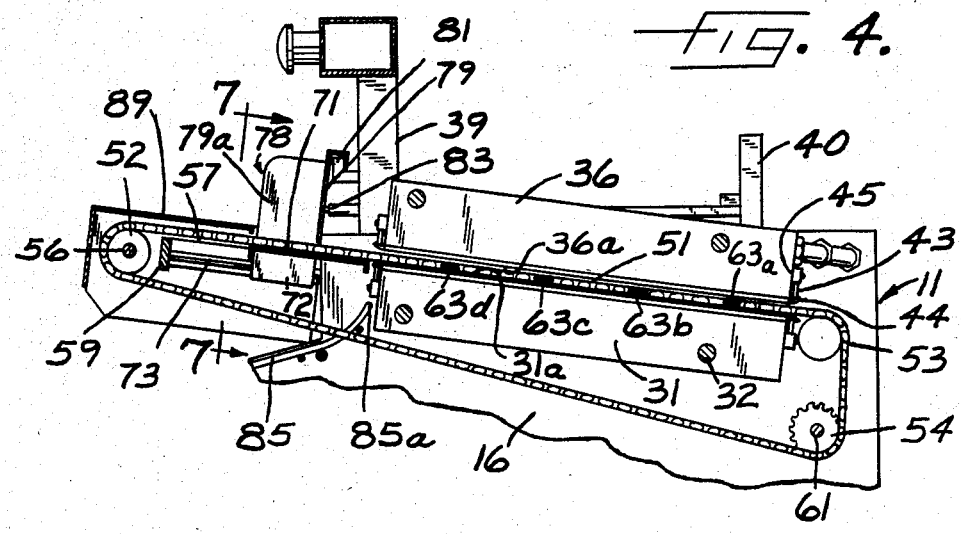
fig. 4.
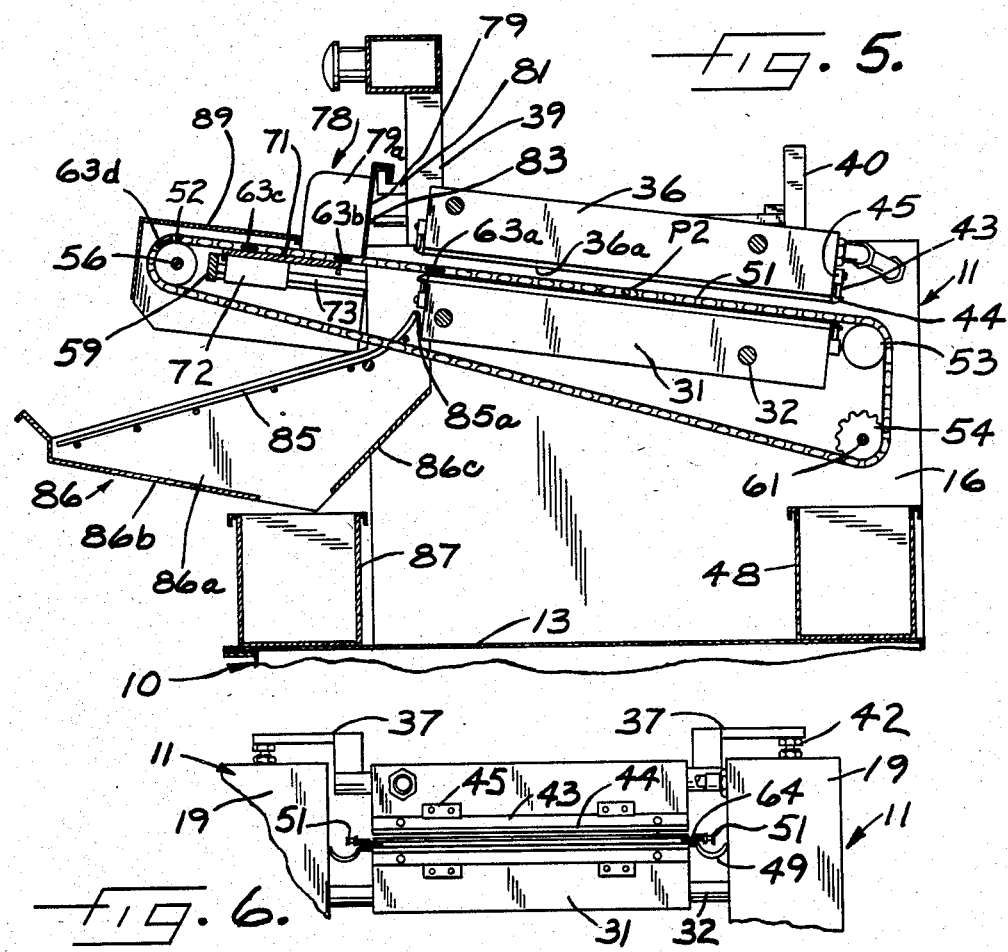
fig. 5.
fig. 6.

APPARATUS FOR TWO-SIDED GRILLING OF HAMBURGER PATTIES

BACKGROUND OF THE INVENTION

Grill apparatus have heretofore been made for automatic two-sided grilling of hamburger patties. In the grill apparatus disclosed in U.S. Pat. Nos. 3,965,807; 3,987,718 and 4,444,094, assigned to the assignee of the present invention, the hamburger patties are conveyed by an endless type conveyor from a loading station at one side of the grill between upper and lower cooking platens and then discharged at a discharge station at the other side of the grill. In Pat. Nos. 3,965,807 and 3,987,718, the patties are conveyed in continuous fashion from the loading station between the cooking platens to the discharge station. In Pat. No. 4,444,094, the conveyor is intermittently operated to advance uncooked patties from a loading station at one end of the grill onto the lower platen. The conveyor is then stopped for a cooking period while the patties are above the lower platen and the upper platen is lowered while the conveyor is stopped to cook the patties on both sides. The upper platen is thereafter raised and the conveyor again operated to advance the cooked patties off the lower platen to a discharge station at the other end of the grill.

Such prior automatic two-sided hamburger grills in which the hamburger patties were loaded at one end of the grill and discharged at the other end of the grill, required operator working space at both ends of the grill and also made it difficult for a single operator to both load uncooked patties at the inlet end of the grill and retrieve cooked hamburger patties at the discharge end.

SUMMARY OF THE INVENTION

It is an object of the present invention to overcome the disadvantages of the prior two-sided hamburger grills by providing a hamburger grill in which a conveyor is operated in one direction to advance uncooked hamburger patties from a loading station at the front of the grill to a position between upper and lower cooking platens for cooking of the patties, and in which the conveyor is thereafter operated in the opposite direction to advance the cooked patties back to the front of the grill for discharge to a cooked pattie receiver at the front of the grill.

Another object of this invention is to provide a grill apparatus for two-sided grilling of hamburgers in accordance with the foregoing object, in which the uncooked hamburger patties are supported by a support panel at the front of the grill for automatic feeding by the conveyor to a position between the cooking platens, and in which the patty support panel is retracted out of the path of discharge of the hamburger patties when the conveyor is operated in a direction to discharge the cooked hamburger patties at the front of the grill apparatus.

Still another object of this invention is to provide a grill apparatus for two-sided grilling of hamburger patties which minimizes the floor space and overhead clearance required for the grill apparatus.

BRIEF DESCRIPTION OF THE DRAWINGS

FIG. 4 is a fragmentary vertical sectional view taken on the plane 4—4 of FIG. 2;

FIG. 5 is a fragmentary vertical sectional view taken on the plane 4—4 of FIG. 2, and illustrating parts in a moved position;

FIG. 6 is a fragmentary transverse sectional view taken on the plane 6—6 of FIG. 2;

FIG. 7 is a fragmentary transverse sectional view taken on the plane 7—7 of FIG. 4.

DETAILED DESCRIPTION

Figure 1:
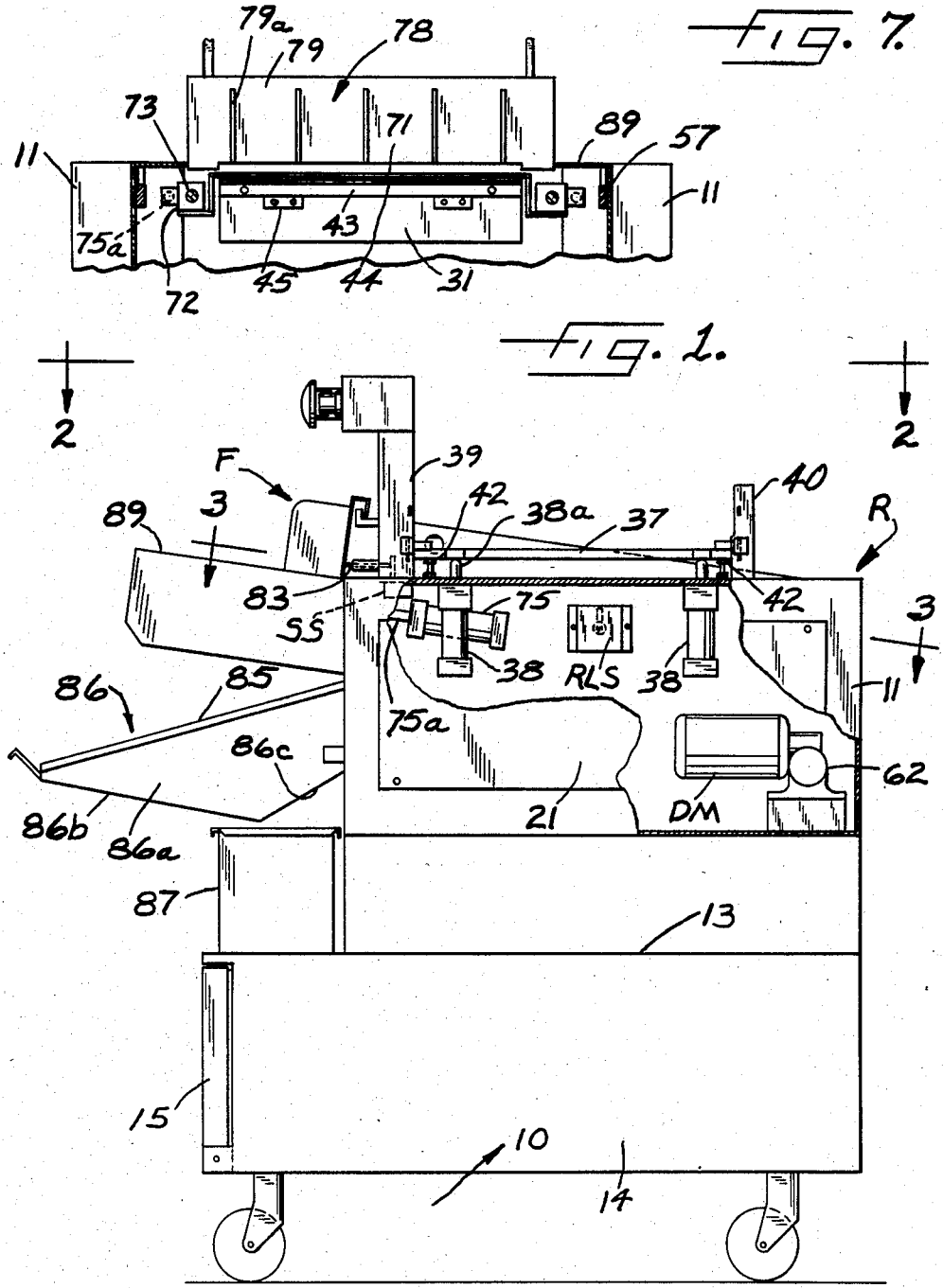
FIG. 1 is a side view of the grill apparatus embodying the present invention, with parts broken away and shown in section to illustrate details of construction.

The grill apparatus is mounted on a support structure that includes a base frame 10 and laterally spaced side frames 11. As shown, the base frame is enclosed by a top panel 13 and side panels 14 and provides an enclosure for the electrical components to be described more fully hereinafter. The electrical components may, for example, be mounted on a drawer or panel (not shown) that is slidable into and out of the base frame 10 and which is closed at its front by a door 15. The side frames are also enclosed by panels and each include an inner panel 16, a top panel 17 and front and rear panels 18 and 19. An outer closure panel 21 is removably attached to the side frames 11 to provide access to the parts in the side frames.

Figure 8:
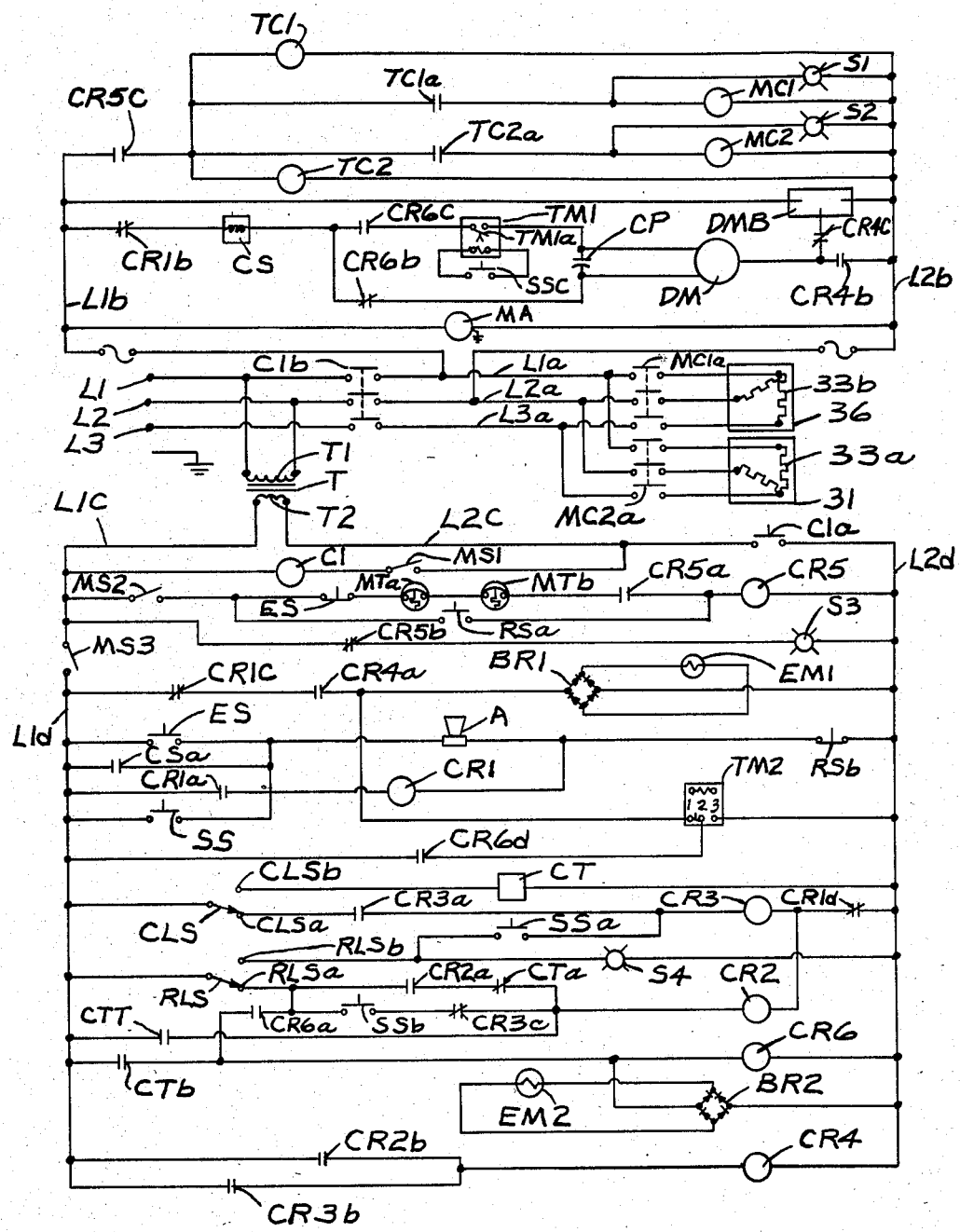
FIG. 8 is a schematic electrical circuit for the grill apparatus.

A lower cooking platen 31 is mounted as by brackets 32 on the side frame to extend therebetween. The lower platen includes a heat conducting upper face 31a formed of metal such as aluminum that may be coated or plated and which is heated by electrically energized heating elements 33a (FIG. 8). An upper cooking platen 36 having a lower heat conductive lower face 36a also formed of a metal such as aluminum is mounted on the side frame with its lower face overlying the upper face of the lower platen. The upper cooking platen is heated by electrically energized heating elements 33b (FIG. 8). The upper platen is mounted for movement toward and away from the lower platen and, for this purpose, platen support brackets 37 are attached to opposite sides of the upper platen and a means such as fluid operators or cylinders 38 are mounted in the side frames with their plungers 38a arranged to engage the support brackets to raise the upper platen when the operators 38 are actuated. The support brackets 37 guidably engage upright guide members 39 and 40 on the side frames to constrain the upper platen against movement in a horizontal direction while allowing vertical movement of the upper platen, and adjustable stops 42 are provided on the side frames 11 and arranged to engage the support brackets 37, to limit downward movement of the upper platen. The adjustable stops 42 can conveniently comprise bolts that are threaded into the side frame members and which can be locked in adjusted position by lock nuts. The adjustable stops are adjusted so as to space the lower cooking surface of the upper platen above the upper surface of the lower platen a distance slightly less than the thickness of an uncooked patty, when the fluid operators 38 are in their lower or retracted position. The fluid operators 38, when actuated, are arranged to lift the upper platen and move its cooking surface away from the upper cooking surface of the lower platen a distance substantially greater than the thickness of the uncooked hamburger patty, to allow free movement of the hamburger patties into and out of position between the upper and lower cooking platens. The cooking surfaces of the upper and lower platens are preferably covered with an anti-stick coating or a layer of anti-stick material such as "Teflon", to inhibit sticking of the hamburgers to the upper and lower platens. A sheet of anti-stick material may, for example, be releasably clamped to the upper and lower platens by strips 43 releasably held in retainer clamps 44, 45 at opposite ends of the platens.

An endless type conveyor is provided for feeding uncooked patties from a patty loading station at the front F of the grill apparatus to a position between the cooking platens 31 and 36, and for thereafter moving cooked patties out from between the cooking platens and discharging the same at the front side of the grill. The endless type conveyor includes a pair of laterally spaced chains 51 that are entrained over front and rear chain guides 52 and 53 and over drive sprockets 54. The front chain guides conveniently comprise a pair of rollers mounted on a cross shaft 56 that is rotatably supported at its ends on front brackets 57 that project forwardly from the side frames 11. The rear guides 53 comprise rollers supported on stub shafts 58 on the side frames and the drive sprockets 54 are non-rotatably secured to a drive shaft 61 that extends crosswise between the side frames 11. An electric drive motor DM is mounted in one of the side frames 11 and is connected through a speed reducer 62 (FIG. 1) to the sprocket drive shaft 61 to drive the sprockets in unison. As pointed out more fully hereinafter, drive motor DM is of a reversible type and is reversibly operated to advance the conveyor in one direction for feeding uncooked patties to a position between the cooking platens, and for advancing the conveyor in the opposite direction to move cooked patties out from between the cooking platens and to discharge the same at the front side of the grill apparatus. A plurality of cross bars, herein shown four in number and designated 63a–63d extend between the endless chains 51 for advancing hamburger patties onto and off of the cooking platens. As best shown in FIG. 6, the chains 51 preferably have guide shoes 64 that rest on and are guided by the upper surface of the lower platen 31, to maintain the underside of the cross bars out of rubbing contact with the upper surface of the lower platen.

Figure 3:
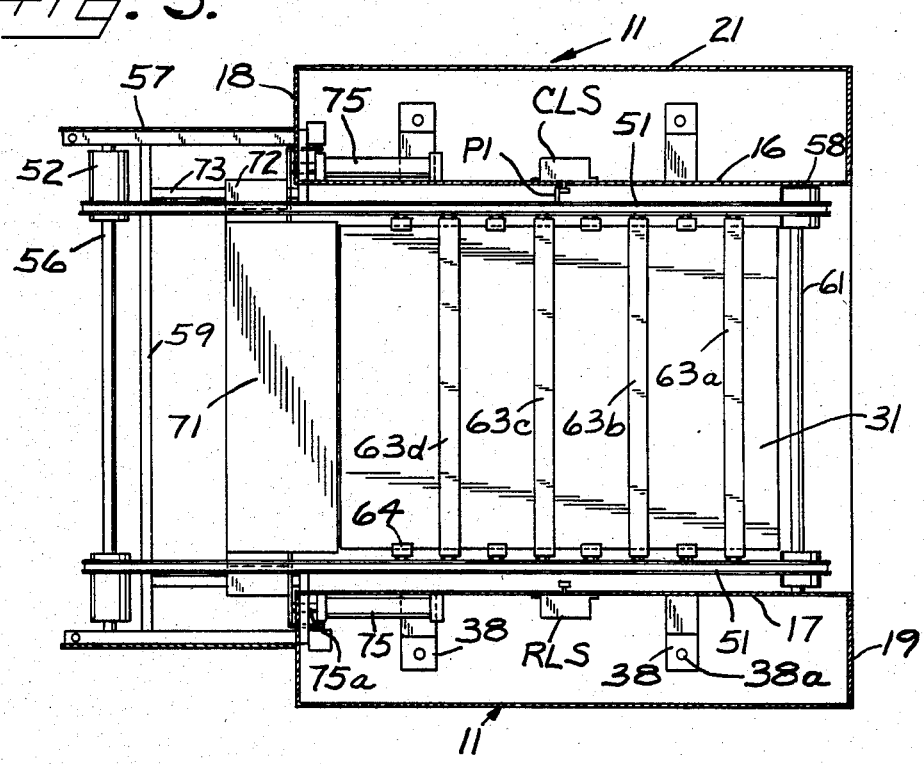
FIG. 3 is a fragmentary sectional view taken on the plane 3—3 of FIG. 1.

Uncooked hamburger patties are supported by a patty support panel 71 at the front side of the platens for advance by the conveyor to a position between the upper and lower platens. The patty support panel is arranged to support a patty generally coplanar with the upper surface of the lower cooking platen and the patty support panel 71 is mounted for movement between a feed position in which it extends closely adjacent the front side of the lower platen 31, as shown in FIG. 4, and a discharge position in which it is spaced from the front side of the lower platen as shown in FIG. 5 to allow discharge of hamburger patties at the front side of the lower platen. As best shown in FIGS. 4, 5 and 7, the patty support panel 71 is guidably supported by followers 72 on guide rods 73 mounted on a cross member 59 attached to the front brackets 57. A means such as fluid operators or cylinders 75 are provided for moving the patty support panel between its feed and discharge positions and, as best shown in FIG. 3, the fluid operators are mounted in the side frames 11 and have rods 75a that are connected to the followers 72 to move the same from a feed position as shown in FIG. 4 when the fluid operators are actuated in one direction, to a discharge position as shown in FIG. 6, when the fluid operators are actuated in the opposite direction. The fluid operators 75 are preferably double acting cylinders and air under pressure is reversibly supplied to the fluid operators under the control of a reversing valve (not shown). The reversing valve is normally positioned to supply fluid pressure to the rod end of the fluid operators 75 to normally position the patty support panel 71 in its feed position, and the reversing valve is operated by a solenoid EM1 FIG. 8 to a position supplying fluid pressure to the other end of the cylinder when the solenoid EM1 is energized.

The front and rear chain guides 52, 53 guide the endless chains 51 so that the cross bars 63a–63d in the upper run of the endless chains move across the upper surface of the patty support panel 71 and across the upper surface of the lower platen 31, while the lower run of the chains extends below the lower cooking platen. A patty magazine 78 extends crosswise of the upper run of the conveyor chains at a location above the patty support panel 71, when the latter is in its feed position, for storing a plurality of stacks of uncooked patties. The patty magazine has a rear panel 79 and divider panels 79a that extend forwardly from the rear panel, and which define a plurality of compartments therebetween that are disposed in side-by-side relation across the front of the grill. The compartments are open at their bottom to allow the stacks to move downwardly as the lowermost hamburger is moved off the bottom of each stack and the compartments are also conveniently open at their front and top to facilitate loading of the stacks of hamburgers into the magazine. The magazine 78 is supported as by brackets 81 on the front upright members 40 and the lower edge 79b of the rear wall 79 is spaced above the panel 71 a distance slightly greater than the thickness of an uncooked patty to allow only a single patty from each stack to pass below the panel 79 as each cross bar moves across the patty support panel and below the patty magazine. Provision is made for sensing if a jam-up occurs during feeding of patties from the magazine and, for this purpose, the patty magazine is yieldably urged by a spring biased plunger 83 in a direction toward the front of the grill to a preselected position as shown in FIG. 4, and a safety switch SS FIGS. 1 and 8 is provided for sensing movement of the magazine in a direction rearwardly from the position shown in FIG. 4, as would occur if a patty or some other object becomes jammed between the conveyor and the magazine and overcomes the forward bias of the spring biased plunger. As will be seen from FIGS. 4 and 5, the front chain guide 52 is spaced from the forward side of the platens a substantial distance sufficient to allow hamburger patties to be discharged from the front of the lower platen at a location rearwardly of the chain guide 52 and the patty support panel 71, when the latter is in its retracted position shown in FIG. 5.

Figure 2:
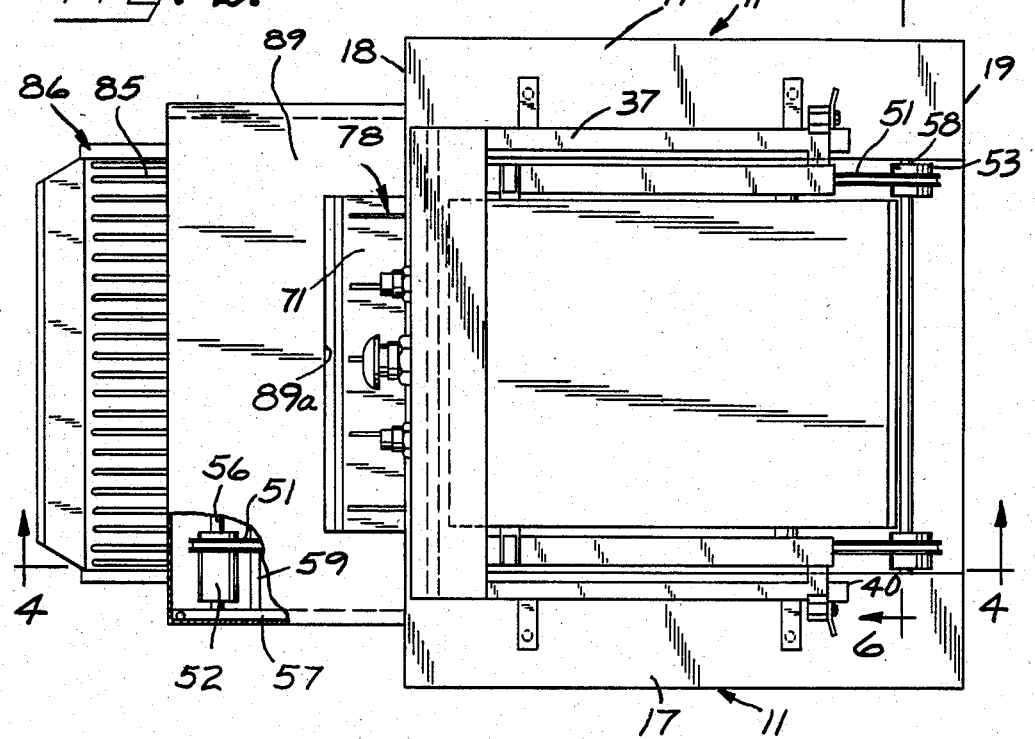
FIG. 2 is a top plan view of the grill apparatus of FIG. 1.

A cooked patty receiver is provided at the front of the grill apparatus for receiving cooked patties discharged from the front side of the lower platen. As shown, the cooked patty receiver 85 is in the form of a wire grid disposed below the upper run of the conveyor and having one end 85a extending to a position closely adjacent the front side of the lower platen. The cooked patty receiver is inclined downwardly and forwardly to receive the hamburger patties discharged from the front end of the lower platen. The grid is removably supported on the sides 86a of the drainage trough 86, and the drainage trough has downwardly inclined bottom walls 86b, 86c arranged to convey fluids such as grease, water and the like which drain from the hamburgers on the grid 85, into a waste receptacle 87. Waste receptacle 87 is conveniently removably supported on the upper panel 13 of the base frame at a location below the drainage trough 86. A shroud 89 is removably mounted on the front bracket 57 to enclose the forward portions of the chains 51, the chain guides 52 and the guide rods 73. As shown in FIGS. 2 and 3, the shroud 89 has an opening 89a to accommodate the magazine 78 and allow loading of hamburger patties on the patty support panel 71 when the latter is in its feed position.

Controls are provided for operating the grilling apparatus through a cooking cycle in which hamburger patties are advanced by the conveyor from the feed station to a position between the platens; the upper platen is lowered to effect two-sided cooking of the hamburgers; and the upper platen thereafter raised and the conveyor subsequently advanced in a reverse direction to move the cooked patties off the lower platen and discharge the same at the front of the grill apparatus into the cooked patty receiver. The patty support panel 71 is positioned in its feed position shown in FIG. 4 during feeding of hamburger patties to a position between the cooking platens, and is moved to its discharge position before the conveyor is operated in its reverse direction to discharge the hamburgers at the front of the grill. The lower and upper platens 31 and 36 are preferably inclined downwardly from front to rear as best shown in FIGS. 4 and 5 so that fluids drain to the rear of the grill and away from the cooked patty receiver 85. A rear waste receptacle 48 is removably positioned on the upper panel 13 of the base at the rear R of the grill to receive fluids draining from the platens. Troughs 49 (FIG. 6) extend along opposite sides of the lower platen 31 and below the upper run of the chains, and also convey fluids to the rear waste receptacle 48.

Reference is now made more specifically to the circuit diagram in FIG. 8. Power is supplied from AC power lines L1, L2 and L3 through the normally open contacts C1b of relay C1 to lines L1a, L2a and L3a. Lines L1a, L2a and L3a are connected through relay contacts MC1a and MC2a to the electrical heaters 33b and 33a of upper and lower cooking platens 36 and 31, respectively. Conductors L1b and L2b are also connected to conductors L1a and L2a. Contactor MC1 is connected through the normally open contacts TC1a of temperature controller TC1 and through the normally open contacts CR5c of relay CR5, across lines L1b and L2b. Similarly contactor MC2 is connected through the normally open contacts TC2a of temperature controller TC2 and through the normally open contacts CR5c of relay CR5, across lines L1b and L2b. Conveyor drive motor DM is of the reversible type such as an induction motor having forward and reverse windings and a phase shifting capacitor CP, and drive motor is connected through normally open contacts CR4b of relay CR4 to line L2b. The forward winding of motor DM is connected through the normally closed contacts CR6b of relay CR6, and through a current sensing relay CS and normally closed contacts CR1b of relay CR1, to the line L1b. The reverse winding of motor DM is connected through normally open contacts TM1a of time delay relay TM1 and through normally open contacts CR6c of relay CR6 and through the aforementioned current sensing relay CS and normally closed contacts CR1b to the line L1b. A motor MA for an air compressor (not shown) to supply air to the fluid operators described hereinafter, is also connected across lines L1b and L2b. A brake DMB for the drive motor DM is connected across lines L1b and L2b, and through the normally closed contacts CR4c of relay CR4 to the motor DM.

A step-down transformer T has its primary T1 connected to lines L1 and L2 and its secondary T2 connected to low voltage lines L1c and L2c. A control relay C1 is connected through a manually operable main start switch MS1 across lines L1c and L2c so that the control relay C1 is energized when the main start switch is closed. Relay C1 is operative when energized to close relay contacts C1a and apply power from line L2c to a line L2d. Control relay CR5 is connected in a series circuit including normally open manually operated heat switch MS2, normally closed emergency stop switch ES, normally closed platen high temperature cut-out switches MTA and MTB, and through normally open contacts CR5a of relay CR5, between lines L1c and L2d. Normally open contacts RSA of a reset switch are connected between the heat switch MS2 and the relay CR5 so that relay CR5 is energized when manually operated heat switch MS2 is closed and the contacts RSA of the reset switch thereafter momentarily closed. When relay CR5 is energized, it closes contacts CR5a and establishes a holding circuit through the aforementioned emergency stop switch and motor temperature control switches MTA and MTB. When relay CR5 is energized, it also closes normally open contacts CR5c and energizes temperature control relays TC1 and TC2. Temperature controllers TC1 and TC2 include means for sensing the temperature of the respective upper and lower cooking platens and are arranged to energize contactors MC1 and MC2 respectively and close contacts MC1a and MC2a to energize the heaters 33b and 33a of the cooking platens 36 and 31 as required to maintain the platens at a preset cooking temperature. Indicator lamps S1 and S2 are connected in parallel with relays MC1 and MC2 to indicate when the heaters are energized. In addition, a red indicator lamp S3 is connected through normally closed contacts CR5b of relay CR5 across the lines L1c and L2d so that the red indicator light S3 is deenergized when the relay CR5 is energized.

A normally open manually operated drive switch MS3 is connected between lines L1c and L1d to apply power to line L1d when it is closed. A solenoid EM1 for controlling application of air to the fluid operators 38 for lifting the upper platen, is connected to the output of a full wave bridge rectifier BR1. One infeed terminal of the bridge rectifier BR1 is connected to line L2d and the other infeed terminal is connected through the normally open contacts CR4a of relay CR4 and normally closed contacts CR1c of relay CR1 to the line L1d. Relay CR4 is connected to line L2d and through parallel connected relay contacts CR2b of relay CR2 and CR3b of relay CR3, to line L1d.

A cook limit switch CLS is arranged to be actuated by the conveyor when the patties have been advanced to a cook position above the lower platen as shown in FIG. 4, and a rest limit switch RLS is arranged to be actuated by the conveyor when the conveyor is moved to a rest position as shown in FIG. 5. The cook limit switch may conveniently be mounted on one of the side frames 11 with its actuator in the path of movement of a pin P1 on one of the conveyor chains, when the conveyor is in the position shown in FIG. 4, and the rest limit switch RLS can conveniently be mounted on the other of the side frames 11 and arranged to engage a pin P2 (FIG. 5) on the other chain, when the conveyor is in the rest position shown in FIG. 5. Cook limit switch CLS is normally positioned to engage a contact CLSa and, when the conveyor reaches its cook position, it is moved out of engagement with contact CLSa and into engagement with contact CLSb. Rest limit switch RLS is normally positioned to engage contact RLSa and, when the conveyor reaches a position shown in FIG. 5, it is moved out of engagement with contact RLSa and into engagement with contact RLSb. Rest limit switch RLS is connected to line L1d and contact RLSa is connected through normally open contacts SSb of manually operable start switch and through normally closed contacts CR3c to relay CR2. Contact RLSb is connected through an indicator lamp S4 to the line L2d and is also connected through a normally open contacts SSa of the manually operable start switch to relay CR3 and relay CR3 is otherwise connected through the normally closed contacts CR1d of relay CR1 to line L2d. If the conveyor is in its rest position, limit switch RLS is moved out of engagement with contact RLSa and into engagement with contact RLSb. Thus, when the normally open contacts SSa of manually operable start switch are closed, relay CR3 is energized and closes contacts CR3a to establish a holding circuit for relay CR3 through the normally closed contacts CLSa of a limit switch CLS. Energization of relay CR3 also closes normally open contacts CR3b and energizes relay CR4. When relay CR4 is energized it closes normally open contacts CR4a and energizes the solenoid EM1 to supply air under pressure to the fluid actuators 38 to lift the upper platen. Energization of relay CR4 also closes contacts CR4b and energizes the drive motor DM through the normally closed contacts CR6b of relay CR6. Relay CR4 also opens normally open contacts CR4c when it is energized and deactuates the drive motor brake DMB. The drive motor will then drive the conveyor forward to advance the cross bars 63a–63b on the upper run of the conveyor in a front-to-rear direction and move uncooked patties from the magazine onto the lower cooking platen. When the conveyor reaches the cook position, limit switch CLS is moved out of engagement with contact CLSa and into engagement with contact CLSb. Cook timer CT is connected from contact CLSb to line L2d and is energized when the limit switch is moved into engagement with contacts CLSb. When the cook limit switch is moved out of engagement with contact CLSa, it deenergizes relay CR3 and energizes the cook timer CT. The cook timer is operative when energized to immediately open normally closed contacts CTa and close normally open contacts CTb of cook timer CT. Contacts CTb are connected to line L1d and through relay CR6 to the line L2d so that the relay is energized when the contacts CTb are closed. A solenoid EM2 for applying pressurized air to the fluid operators 75 for the patty support panel is connected to the output terminals of a full wave bridge rectifier BR2. One input terminal of the rectifier BR2 is connected to contacts CTb and the other terminal to line L2d. Thus, the solenoid EM2 is energized when contacts CTb close and solenoid EM2 operates a reversing valve (not shown) to reverse the application of fluid pressure to the fluid operators 75 and thereby move the patty support panel 71 to its discharge position shown in FIG. 5. When relay CR6 is energized, it opens the normally closed contacts CR6b connected to the forward drive winding of the motor DM, and closes contacts CR6c that are connected through the timer TM1 to the reverse drive winding of the motor DM. Energization of relay CR6 also closes normally open contacts CR6a and establishes a holding circuit through limit switch RLS, contact RLSa and relay contacts CR6a to relay CR6. Relay CR6 thus remains energized until the limit switch RLS is moved out of engagement with contact RLSa, as occurs when the conveyor reaches its rest position shown in FIG. 6. Energization of relay CR6 also closes normally open contacts CR6d and establishes a circuit to terminals 2, 3 of a timer TM2. Timer TM2 is arranged to establish a circuit through its terminals 1, 2 for a selectively presettable time interval after power is applied to terminals 2 and 3, and terminal 1 of timer TM2 is connected to the bridge rectifier BR1 to maintain the solenoid EM1 energized for a short time interval after the conveyor reaches its cook position to assure that the conveyor is stopped before the upper platen is lowered. Timer TM2 can also be adjusted to a somewhat longer interval, but less than the total cooking time, to allow cooking of the hamburger patty on the bottom side for a short interval prior to two-sided cooking, if desired.

Cook timer CT is arranged to close normally open contacts CTT a selectively adjustable time interval after the cooked timer is energized. Contacts CTT are connected between the line L1d and the relay CR2 to energize the relay CR2 on closing of contacts CTT and relay CR2 is operative when energized to close the normally open contacts CR2b and energize relay CR4. Energization of relay CR4 closes the normally open contacts CR4b and opens contacts CR4c to energize the drive motor DM through the reverse drive circuit including the time delay relay TM1. Time delay relay TM1 is arranged to close normally open contacts TM1a a preselected selectively adjustable interval after power is applied to relay TM1 and, when contacts TM1a are closed, the drive motor is energized to drive the conveyor in its reverse direction back to its rest position shown in FIG. 5. This assures that the upper platen is raised before driving the conveyor in the reverse direction. Timer TM1 can also be adjusted to allow cooking of the bottom side of the patty for a short interval after two-sided cooking, if that is desired.

Provision is made for stopping operation of the grill apparatus in the event of any of several different malfunctions. Relay CR1 is connected through normally closed contacts RSb of the manually operable reset switch RSb to line L2d and is otherwise connected through parallel connected normally open emergency stop switch ES; normally open contacts CSa of current sensing relay CS; and normally open contacts of safety switch SS. Current sensing relay CS senses excess current draw by the drive motor DM, as may occur in the event of a jam or stall of the conveyor, and safety switch SS senses movement of the patty magazine such as would occur in the event an object becomes jamed between a conveyor and the patty magazine. Emergency stop switch ES is manually operable to its closed position. In the event any of the above switches closes, relay CR1 is energized and establishes a holding circuit through its normally open contacts CR1a. Energization of relay CR1 opens contacts CR1c to disable the lift solenoid EM1 and also opens normally closed contacts CR1b to disable the drive motor DM. It also opens normally closed contacts CR1d to disable the relays CR2 and CR3. An audible alarm A is connected across the relay CR1 to indicate that a malfunction has occurred. Relay CR1 can thereafter be deenergized only by operating the reset button to open contacts RSb.

From the foregoing it is thought that the construction and operation of the front load and unload grill apparatus for two-sided grilling of hamburger patties will be readily understood. When the conveyor is in its rest position shown in FIG. 4, the patty support panel 71 is in its feed position as shown in FIG. 4. A stack of hamburgers can be positioned in some or all of the compartments of the magazine 71 and a number of hamburgers can be provided in each stack up to the number of spaces between adjacent cross bars 63a–63d. In the embodiment shown, the magazine has four compartments which will receive up to four stacks and the conveyor has four cross bars so that the stacks can have up to three hamburger patties in each stack. The cross bars 63a–63d are spaced apart a distance greater than the maximum diameter of the hamburger patties and, when the conveyor is in its rest position, one cross bar 63a is positioned as shown in FIG. 5, adjacent the outlet side of the magazine 71 and the next adjacent cross bar 63b is positioned adjacent the inlet side of the magazine. When the main switch MS1 is closed, it energizes relay C1 and relay C1 closes contacts C1a to apply power to line L2d. Closing of the manually operable heat switch MS2 energizes relay CR5 and closes contacts CR5c to apply power to the temperature controllers TC1 and TC2. The temperature controllers operate the contactors MC1 and MC2 to apply power to the heaters 33b and 33a of the upper and lower cooking platens and, when they reach a preset cooking temperature, indicator lights S1 and S2 are deenergized. Closing of the drive switch MS2 applies power from line L1c to line L1d. When the conveyor is in its rest position, limit switch RLS is in engagement with contact RLSb and, when the manually operable start switch is operated, contacts SSa are closed to energize relay CR3. When CR3 is energized, it establishes a holding circuit through contacts CR3a and cook limit switch contacts CLSa. When CR3 is energized, it also closes contacts CR3b and energizes relay CR4. This applies power to the solenoid EM1 to supply air to the fluid operators 38 and lift the upper platen. Energization of relay CR4 also closes the normally open contacts CR4b and opens contacts CR4c to establish a circuit to the drive motor through normally closed relay contacts CR6b. The conveyor drive motor then drives the conveyor in a forward direction and, as the cross bars 63b, 63c and 63d move in succession under the magazine, they strip off the lowermost uncooked hamburger patty in each magazine compartment and advance the same across the patty support panel 71 and to a position between the upper and lower cooking platens as shown in FIG. 4. When the conveyor reaches its cook position, cook limit switch CLS moves out of engagement with contact CLSa to deenergize relay CR3 and into engagement with contacts CLSb to energize a cook timer CT. When the cook timer starts, contacts CT6b instantly close and energize relay CR6. Relay CR6 closes contacts CR6d to apply power to terminals 2, 3 of timer TM2 and the timer TM2 is operative to maintain a circuit through terminals 1, 2 to the lift solenoid EM1 for a short time interval after power is applied to the terminals 2, 3 to assure that the conveyor is stopped before the upper platen is lowered. Timer TM2 can also be adjusted to allow some cooking of the underside of the patty before the two-sided cooking is commenced, if this is desired. After the short time interval preset on timer TM2, solenoid EM1 is deenergized and an upper platen is lowered and comes to rest on the hamburger patties. As the patties cook from both sides, the upper platen moves down by gravity and comes to rest against the adjustable stops 42 which control the minimum thickness of the cooked hamburgers. Energization of relay CR6 also opens normally closed contacts CR6b and opens contacts CR6c and closes normally open contacts CR6a. After the preselected adjustable cook time, cook timer CT closes the contacts CTT and energizes relay CR2. Relay CR2 operates relay CR4 and closes contacts CR4b and opens contacts CR4c to establish a circuit to the drive motor through the time delay relay TM1 and contacts CR6c. Energization of relay CR4 also closes contacts CR4a to operate lift solenoid EM1 to raise the upper platen. A predetermined time interval after contacts CR4b close, timer TM1 closes contacts TM1a and energizes the drive motor DM in the reverse direction. When the conveyor is driven in its reverse direction, cook limit switch moves from a position engaging contacts CLSb to a position engaging contacts CLSa and deenergizes the cook timer. When the conveyor reaches its rest position shown in FIG. 5, rest limit switch RLS is moved from a position engaging contacts RLSa to a position engaging contacts RLSb, and the grill is then set for a succeeding operating cycle.

The grill apparatus enables loading of uncooked hamburger patties and unloading of cooked hamburger patties from the front side of the grill and avoids the necessity of providing space at the rear side of the grill for retrieving cooked hamburgers. The cooking platens are advantageously inclined downwardly and rearwardly to convey fluids such as water and grease to the rear waste receptacle 48 and away from the cooked hamburger patties that are discharged at the front side of the grill onto the cooked patty receiver. The patty support panel is retracted away from the front of the lower platen before the conveyor is operated to discharge cooked hamburger patties from the front of the lower platen onto the front patty receiver. This avoids contamination of the patty support panel and patty magazine by the cooked hamburger and also reduces the overall space required at the front of the machine for the cooked patty receiver.

I claim:

1. A front loading and unloading grill apparatus for two-sided grilling of hamburger patties, the grill apparatus having front and rear sides and including a support frame, a lower cooking platen mounted on the frame and having an upper cooking surface, an upper cooking platen mounted on the frame and having a lower cooking surface overlying the upper cooking surface of the lower platen, cooked patty receiving means at the front of the grill for receiving cooked patties discharged from the front side of the lower platen, a patty support panel for uncooked patties mounted on the frame at the front of the grill for movement between a patty feed position in which it is disposed adjacent the upper cooking surface of the lower platen to guide uncooked patties onto the lower platen and a discharge position in which it is out of the path of movement of cooked patties discharged from the front of the lower platen, conveyor means having a plurality of cross bars, conveyor means drive means for reversibly driving said conveyor means and operable when said patty support panel is in its feed position to drive said conveyor means from a rest position in a front-to-rear direction to move the cross bars across the patty support panel and along the upper surface of the lower plate to a cook position above the lower platen to advance uncooked patties onto the lower platen, means for operating the upper and lower platens to cook patties advanced onto the lower platen, said conveyor drive means being operable when the patty support panel is in its discharge position to drive the conveyor means from the cook position in a rear-to-front direction back to the rest position to move cooked patties off the lower platen and discharge the same at the front of the lower platen into the cooked patty receiving means.

2. A front loading and unloading grill apparatus according to claim 1 wherein said patty support panel is mounted for movement in a plane at the level of the upper surface of the lower platen between its feed position adjacent the forward side of the lower platen and its discharge position spaced from the forward side of the ower platen.

3. A front loading and unloading grill apparatus according to claim 2 wherein said means for operating the upper and lower platens to cook patties includes means for relatively moving the upper and lower platens in a direction to increase the spacing therebetween during driving of the conveyor means in said front-to-rear direction and in said rear-to-front direction.

4. A front loading and unloading grill apparatus according to claim 1 wherein said means for operating the upper and lower platens to cook patties includes means for relatively moving the upper and lower platens in a direction to increase the spacing therebetween during driving of the conveyor means in said front-to-rear direction and in said rear-to-front direction.

5. A front loading and unloading grill apparatus according to claim 1 wherein the upper and lower platens have their respective cooking faces inclined downwardly from front to rear, and a rear collection receptacle means positioned below the rear side of the lower platen to receive fluid draining therefrom.

6. A front loading and unloading grill apparatus according to claim 5 including trough extending along opposite sides of the lower platen and inclined downwardly from front to rear to convey fluid to the rear collection receptacle means.

7. A front loading and unloading grill apparatus according to claim 1 including power operated means for moving said patty support panel between its feed and discharge positions, and control means for controlling said power operated means and said conveyor drive means to move said patty support panel to its discharge position while said conveyor means is moved in said rear-to-front direction to its rest position and to move said patty support panel to its feed position while said conveyor means is moved in said front-to-rear direction to its cook position.

8. A front loading and unloading grill apparatus according to claim 1 wherein said conveyor means includes a pair of laterally spaced endless chains having said cross bars extending therebetween, the chains having an upper run extending between front and rear chain guides adjacent the plane through the upper cooking surface of the lower platen and a lower run extending between the front and rear chain guides below the lower platen.

9. A front loading and unloading grill apparatus according to claim 8 wherein the front chain guide is spaced from the front of the lower platen a distance to allow cooked patties discharged from the front side of the lower platen to pass downwardly between the pair of laterally rally spaced chains to the cooked patty receiving means.

10. A front loading and unloading grill apparatus according to claim 9 including a patty magazine extending crosswise of the upper run of the conveyor chains at a location above the patty support panel when the latter is in its feed position for storing a plurality of stacks of uncooked patties, the magazine having a lower edge spaced above the patty support panel a distance to allow only a single patty from each stack to pass therebelow as each cross bar moves across the patty support panel and below the patty magazine.

11. A front loading and unloading grill apparatus for two-sided grilling of hamburger patties, the grill having front and rear sides and including a support frame, a lower cooking platen mounted on the frame and having an upper cooking surface, an upper cooking platen mounted on the frame and having a lower cooking surface, platen moving means for relatively moving the platens in a direction to change the spacing between the upper and lower cooking surfaces, a cooked patty receiving means at the front of the grill for receiving cooked patties discharged from the front side of the lower platen, a patty support panel for uncooked patties mounted on the frame at the front of the grill, panel moving means for moving the support panel between a patty feed position in which it is disposed adjacent the lower platen and generally coplanar with the upper cooking surface and a discharge position in which it is out of the path of movement of cooked patties discharged from the front of the lower platen, conveyor means including a pair of laterally spaced endless conveyor chains having a plurality of cross bars extending therebetween, the endless conveyor chains having an upper run extending between front and rear chain guides adjacent a plane through the upper cooking surface of the lower platen and a lower run extending between the front and rear chain guides below the lower platen, conveyor drive means for reversibly driving the conveyor means and operable to drive the upper run of the conveyor means from a rest position in a front-to-rear direction to move the cross bars across the patty support panel and along the upper surface of the lower platen to a cook position above the lower platen, said conveyor drive means being operable to drive the upper run of the conveyor means from the cook position in a rear-to-front direction back to the rest position to move cooked patties off the lower platen and discharge the same at the front of the lower platen, control means for operating the panel moving means to its discharge position while the conveyor means is driven from the cook position back to the rest position, said control means including means for operating on said platen moving means to increase the spacing between the platens while the conveyor means is driven from its rest position to its cook position and while said conveyor means is driven from its cook position back to its rest position.

12. A front loading and unloading grill apparatus according to claim 11 including a patty magazine extending crosswise of the upper run of the conveyor chains at a location above said support panel when the latter is in its feed position, the magazine having a lower edge spaced above the patty support panel a distance to allow only a single patty from each stack to pass therebelow as each cross bar moves across the patty support panel and below the patty magazine.

13. A front loading and unloading grill apparatus according to claim 11 wherein said front chain guide is spaced from the front of the lower platen a distance to allow cooked patties discharged from the front side of the lower platen to pass downwardly between the pair of laterally spaced chains when the patty support panel is in its discharge position.

14. A front loading and unloading grill apparatus according to claim 13 including a patty magazine extending crosswise of the upper run of the conveyor chains at a location above said support panel when the latter is in its feed position, the magazine having a lower edge spaced above the patty support panel a distance to allow only a single patty from each stack to pass therebelow as each cross bar moves across the patty support panel and below the patty magazine.

15. A front loading and unloading grill apparatus according to claim 13 wherein said patty support panel is movable in a plane generally paralleling the upper cooking surface of the lower platen between its feed and discharge positions.

16. A front loading and unloading grill apparatus according to claim 11 wherein said lower platen has its upper cooking surface inclined downwardly from front-to-rear, and a collection receptacle means positioned below the rear side of the platen to receive fluids draining therefrom.

17. A front loading and unloading grill apparatus according to claim 16 including troughs extending along opposite sides of the lower platen and inclined downwardly from front-to-rear to convey fluids to the rear collection receptacle.

* * * * *